United States Patent
Iqbal et al.

(10) Patent No.: US 11,050,753 B2
(45) Date of Patent: Jun. 29, 2021

(54) DATA DRIVEN ROLE PERMISSIONS

(71) Applicant: Oracle International Corporation, Redwood Shores, CA (US)

(72) Inventors: Arif Iqbal, San Carlos, CA (US); Suman Ganta, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 341 days.

(21) Appl. No.: 16/039,262

(22) Filed: Jul. 18, 2018

(65) Prior Publication Data

US 2019/0104129 A1 Apr. 4, 2019

Related U.S. Application Data

(60) Provisional application No. 62/566,237, filed on Sep. 29, 2017, provisional application No. 62/566,243, filed on Sep. 29, 2017, provisional application No. 62/566,244, filed on Sep. 29, 2017.

(51) Int. Cl.
*H04L 29/06* (2006.01)
*G06F 21/62* (2013.01)
*G06F 21/60* (2013.01)

(52) U.S. Cl.
CPC ......... *H04L 63/102* (2013.01); *G06F 21/604* (2013.01); *G06F 21/6218* (2013.01); *H04L 63/101* (2013.01); *H04L 63/104* (2013.01); *H04L 63/20* (2013.01); *G06F 2221/2141* (2013.01); *G06F 2221/2145* (2013.01)

(58) Field of Classification Search
CPC .................................................... H04L 63/102
See application file for complete search history.

(56) References Cited

U.S. PATENT DOCUMENTS

| | | | | |
|---|---|---|---|---|
| 10,122,757 | B1* | 11/2018 | Kruse | H04L 63/10 |
| 2002/0184521 | A1* | 12/2002 | Lucovsky | G06F 21/6227 726/6 |
| 2002/0199123 | A1* | 12/2002 | McIntyre | H04L 63/104 726/3 |
| 2003/0229623 | A1* | 12/2003 | Chang | G06F 21/6218 |
| 2007/0180490 | A1* | 8/2007 | Renzi | H04L 63/145 726/1 |
| 2011/0277017 | A1* | 11/2011 | Ivanov | G06F 21/6218 726/4 |
| 2012/0311672 | A1* | 12/2012 | Connor | H04L 63/105 726/4 |
| 2013/0024909 | A1* | 1/2013 | Morita | G06F 21/6218 726/1 |
| 2013/0104046 | A1* | 4/2013 | Casco-Arias Sanchez | H04L 63/20 715/736 |
| 2018/0101691 | A1* | 4/2018 | Das | H04L 63/102 |
| 2018/0150650 | A1* | 5/2018 | Saunders | G16H 10/60 |
| 2019/0104129 | A1* | 4/2019 | Iqbal | H04L 63/104 |

* cited by examiner

*Primary Examiner* — Ponnoreay Pich
(74) *Attorney, Agent, or Firm* — Trellis IP Law Group, PC

(57) ABSTRACT

An embodiment provides data driven role permissions. Computer executable instructions are received. The computer executable instructions define a role behavior with respect to a process based on a data condition. A role member user is provided different types of interactions with different instances of the process based on execution of the computer executable instructions defining the role behavior.

20 Claims, 7 Drawing Sheets

FIGURE 1

```
Role: 110
{--111
"roleId": "underwriter_10",--112
"roleDisplayName": "UnderWriter",--113
"scopeType": "INSTANCE",--114
"scope":"LoanRequest:1"--115
}--116

Permissions:--120
[--121
{--122
 "id": "30",--123
 "condition": " ${loanamount > 1000}--124
 "actions": ["READ"],--125
 "resources":[--126
    {--127
      "resourceType": "CASE_DATA",--128
      "resourceId": "loan_dataobject",--129
      "subResourceId":"*"--130
    }--131
 ]--132
},--133
{--140
 "id": "35",--141
 "condition": " ${loanamount <= 1000},--142
 "actions": ["READ", "UPDATE"],--143
 "resources":[--144
    {--145
      "resourceType": "CASE_DATA",--146
      "resourceId": "loan_dataobject",--147
      "subResourceId":"*"--148
    }--149
 ]--150
}--151

]--160
```

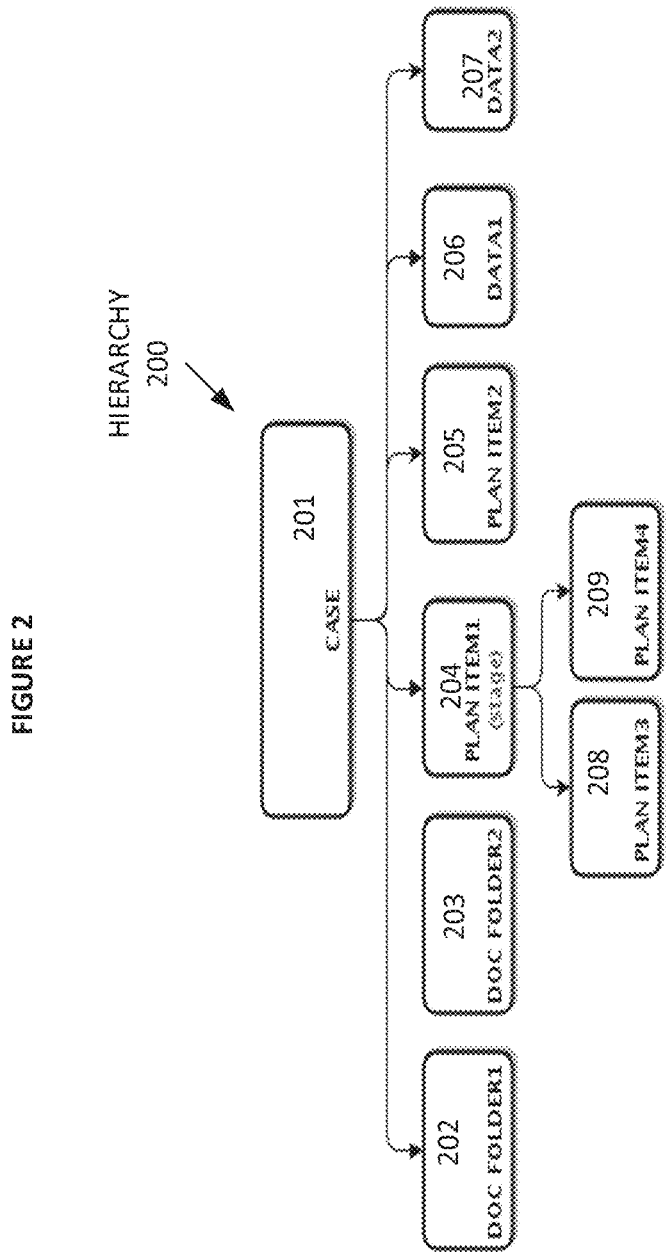

DATA DRIVEN ROLE PERMISSIONS

CROSS REFERENCES TO RELATED APPLICATIONS

This application claims the benefit of U.S. Provisional Patent Application Ser. No. 62/566,237, entitled INSTANCE LEVEL ROLE PERMISSIONS/MEMBERSHIP OVERRIDES, filed on Sep. 29, 2017 (ORACP0223P/ORA180380-US-PSP), U.S. Provisional Patent Application Ser. No. 62/566,243, entitled DATA DRIVEN ROLE PERMISSIONS, filed on Sep. 29, 2017 (ORACP0224P/ORA180381-US-PSP), and U.S. Provisional Patent Application Ser. No. 62/566,244, entitled PROPAGATING PERMISSIONS ON RESOURCE HIERARCHY, filed on Sep. 29, 2017 (ORACP0225P/ORA180382-US-PSP), which are hereby incorporated by reference as if set forth in full in this application for all purposes.

BACKGROUND

The problem in the conventional art is that by default, a role has access to all activities for requests. For example, in the case of a travel request application, conventionally, by default, the expense approval role will have access to all expenses of the travel approval request.

In order to address this problem using conventional methods, an administrator and/or developer would have to create a new role application type, create a new application, deploy the application, and use that application for submitting a particular confidential travel request that they want different access permission for. They would assign access to that application to a different role whose members would be different from the original expense approval role. This would require a developer and/or an administrator to engage in many activities. At a minimum, it would require intensive user interface interactions.

Further, conventional application instances obey the same roles and permissions defined by the modeler but sometimes there is an exception. Therefore, the business may want to change a role behavior for a specific application instance. For example, assume for the sake of illustration that there is a loan application that was submitted for a hundred million dollars. Since this loan is for a large sum of money, the business may want this particular loan application to be looked at by different people not just by the people with their respective roles assigned by the initial model design. More specifically, the business may want the submitter to not just have view permission but also to be granted additional permissions, such as document download permission, for this particular one million dollar loan application. Each loan application in this illustration is an example of an "instance." Continuing the example, the business may also grant a user who only had read permission for loan applications to also have update permission for this particular one million dollar loan application.

Conventionally, an administrator and/or developer would have to create a different application for these special types of approvals, create different roles with different members for that application, and deploy the application with the different roles. This would require a developer and/or an administrator to engage in many activities. At a minimum, it would require intensive user interface interactions.

SUMMARY

An embodiment provides data driven role permissions. Computer executable instructions are received. The computer executable instructions define a role behavior with respect to a process based on a data condition. A role member user is provided different types of interactions with different instances of the process based on execution of the computer executable instructions defining the role behavior.

An embodiment provides a tangible processor-readable storage device including instructions for a method of providing data driven role permissions, the method comprising: receiving computer executable instructions defining a role behavior with respect to a process based on a data condition; and providing a role member user different types of interactions with different instances of the process based on execution of the computer executable instructions defining the role behavior.

A further understanding of the nature and the advantages of particular embodiments disclosed herein may be realized by reference of the remaining portions of the specification and the attached drawings.

BRIEF DESCRIPTION OF THE DRAWINGS

FIG. 1 depicts a permission model for providing data driven role permissions, according to one embodiment.

FIG. 2 depicts a block diagram of a resource hierarchy, according to one embodiment.

DETAILED DESCRIPTION OF EMBODIMENTS

Figure 3:
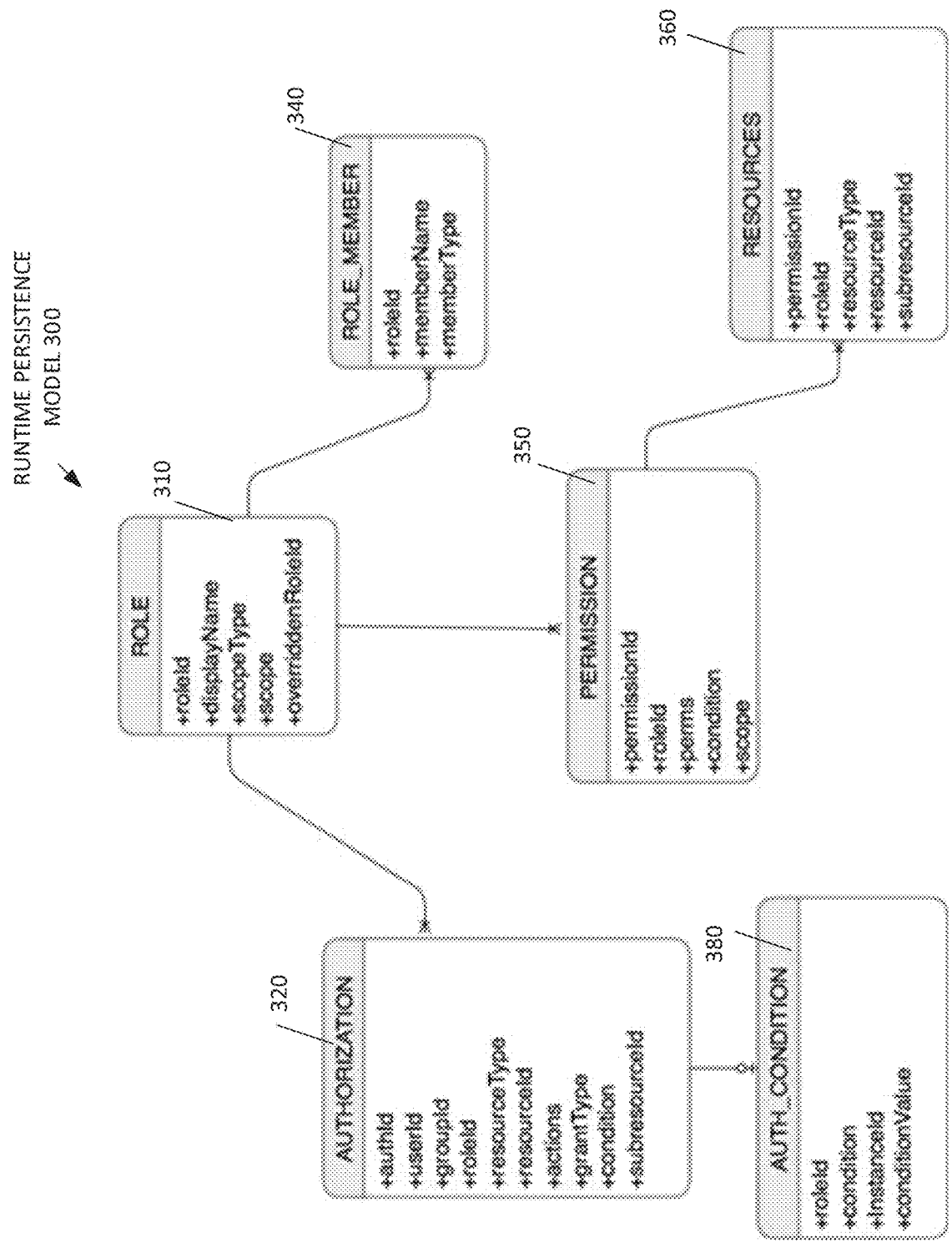
FIG. 3 depicts a block diagram of a runtime persistent model, according to one embodiment.

FIG. 1 depicts a permission model for providing data driven role permissions, according to one embodiment. The permission model depicted in FIG. 1 is provided by way of example. Embodiments are not limited to the permissions model depicted in FIG. 1.

Consider the following use case: The use for data driven arises when, based on well known business patterns, it is already known that a given role it is useful to have different permissions on a given resource based on the different instance data. For example, some examples can be that for a Loan Application Process: An underwriter role can have "READ/UPDATE" permission on loan data only if the loan amount is greater than 1000. Otherwise, the underwriter role has only "READ" permission; if the loan category is "housing", then it is useful for only "housing appraiser" role users to have "VIEW/UPDATE" access to loan application. But if loan category is "business", then it is useful for only "business appraiser" role users to have "VIEW" access to the loan application.

Data drive role permissions enable the company to provide a permission model to customize the loan process for each loan application (also referred to as an "instance") based on the loan application data. An employee is an example of a user.

A user, referred to as a modeler, can create the permission model, as depicted in FIG. 1, using computer executable code. The computer executable code includes computer executable instructions such as assignment statements, conditional statements, and other programming language constructs.

The example depicted in FIG. 1 includes two sections and three paragraphs. The first section pertains to roles and includes instructions 110-116. The second section pertains to permissions and includes instructions 120-151. The first paragraph includes instructions 111-116. The second paragraph includes instructions 121-133. The third paragraph includes instructions 140-151.

In this example, the role pertains to an underwriter as specified in instruction 112 and the scope pertains to a loan request as specified in instruction 115. The scopeType is an instance (114). The instance is a request for a loan. For example, each loan application is an example of a separate instance.

The first paragraph specifies a condition in instruction 124 and a level of access at instruction 125 that allows this particular underwriter to read the loan application when the loan amount is greater than $1000.

The second paragraph specifies a condition in instruction 142 and a level of access at instruction 143 that allows this same particular underwriter to read and update the loan application when the loan amount is less than $1000.

The logic at instructions 124 and 142 for checking whether a loan amount is greater or less than or equal to a certain amount are also referred to as "data conditions."

Therefore, embodiments provide role behavior to be varied across different process instances. For example, an underwriter A can be provided read access (also known as "view access") to loan applications for amounts greater than $1000 and underwriter A can be provided read and write access (also known as "read/update" or "view/update" access) to loan applications for amounts less than or equal to $1000. In another example, an underwriter C can be provided read access to loan applications for amounts greater than $1000 and underwriter D can be provided read and write access to loan applications for amounts less than or equal to $1000.

Embodiments are well suited to other types of roles and other types of instances. For example, the instances may be medical documents or patient cases and the roles may be different types of health professionals.

Computer executable instructions 110-160 can be received. An example of a process is loan application requests. An underwriter, such as underwriter A, C, or D, is an example of a user in this illustration. The first paragraph including instructions 121-133 and the second paragraph including instructions 140-151 are two examples of defining role behaviors. Read permission specified in instruction 125 and read and update permissions specified in instruction 143 are examples of different types of interactions that the underwriter may be provided for different instances (different loan applications) of the loan application process.

FIG. 2 depicts a block diagram of a resource hierarchy 200, according to one embodiment.

Various embodiments makes it easier for a user to define permissions on resources arranged in a large tree structure, as depicted in FIG. 2, having multiple levels and nodes in the hierarchy.

The hierarchy 200 includes entities 201-209 in three levels. The top level is a process level that in this example is case 201. The second level includes steps of the process level that includes 202-207. The third level includes substeps 208-209. The substeps 208-209 in this example are substeps of step 204. Steps can also be referred to as stages of the process.

The process is a dynamic process that has multiple steps where one or more of the steps can have substeps, as depicted in FIG. 2.

For the purpose of illustration, assume that one example of a dynamic process is hospital patient management. The process level 201 is the case for that patient. The process can include steps for checking the patient in, performing an initial analysis, performing lab work, providing a diagnosis based on the lab work, informing the patient of the diagnosis, performing surgery, checking the patient out of the hospital, and so on. One or more of the steps can have substeps. Each entity 201-209 has its own respective data associated with it that people who are authorized to view the respective data can interact with, for example, by viewing it, updating it, and so on depending on the permissions that they have been granted. The data associated with the entities 201-209 are examples of resources that are associated with the resource hierarchy 200.

Data associated with each node is isolated. For example, an authorized user can only interact with the data associated with the nodes that they have permission to interact with. Further, their interactions with respect to that data is defined by the permissions for their role.

Various people perform these steps and substeps. A monitor user may be able to view the data associated with the case and all of the steps and substeps.

Some people, such as a doctor in this scenario, would be involved in one or more of the steps and substeps associated with those steps. It is time consuming to associate permissions for that doctor to interact with the data for all of the steps and substeps that the doctor would be involved in.

Therefore, according to various embodiments, permissions for that doctor are propagated throughout the resource hierarchy to the entities that the doctor would be involved with, thus, saving valuable time. For example, a particular doctor may have authorization to view data for everything associated with the case level 201, the second level 202-207, and the third level 208-209, except for data associated with one or more steps or substeps. In a specific example, for the sake of illustration, assume that the doctor may have authorization to view data associated with all of the steps and substeps except for data 2 207. Therefore, the doctor's permissions/authorization would be propagated to 201, 202-206, 208, and 209 but not 207, according to one embodiment. In another example, assume of the sake of illustration, that a hospital employee is authorized to interact with 204 and 208, which is under 204, but not 209, which is also under 204. Providing for the propagating of permissions for specified resource of a resource hierarchy and enabling overriding permissions to be specified at any child node, as discussed herein, makes it much easier for an administrator to define permissions.

FIG. 2 depicts a resource hierarchy 200 that has multiple nodes 201-209 that are arranged in levels (three levels in this example), where each of the nodes 201-209 is associated with separate resource, such as different pieces of data. A permission, such as read, or write, or read and write, for a user, such as a particular doctor, can be propagated from a first node, such as node 204, to one or more lower nodes, such as 208 and/or 209, arranged below the first node 204. The user can interact with each of the resources (pieces of data) associated with the first node, such as 204, and the one or more of the lower nodes, such as 208 and/or 209, based on the propagated permission.

Various embodiments are also well suited for propagating data driven role permissions to various entities associated with a resource hierarchy 200 (FIG. 2). For example, a defined underwriter role behavior may provide a particular underwriter access to plan item 1 204 (FIG. 2) only when the loan amount is greater than $1000, according to one embodiment, that same role behavior can be automatically propagated to the underlying subsets 208 and 209. Further, exceptions can be made to propagating role behavior. Continuing the example that role behavior is associated with 204, role behavior can be propagated to 208 while not propagating role behavior to 209, as discussed herein.

The propagation of the permission can be prevented for any child node (and its children nodes) by defining a permission on that node. A node's descendant nodes are also referred to herein as "lower nodes." For example, a node's children, grandchildren, grant great children and so on are "lower nodes" with respect to that node. Continuing the example, if permission defined at node 200 is not be applied on node 204, then a separate permission can be defined at node 204. The permission defined at node 204 can be propagated to nodes 208 and 209, according to various embodiments.

Although FIG. 2 depicted three levels, embodiments are well suited to any number of levels including two or more.

FIG. 3 depicts a block diagram of a runtime persistent model 300, according to one embodiment.

The runtime persistent model 300 includes one or more tables 320-360, such as an authorization table 320, an auth_condition table 380, a permission table 350, a role_member table 340 and a resources table 360. The role table 310 is coupled with tables 320, 350, and 340. Table 320 is coupled with table 380. Table 350 is coupled with table 360.

Role behavior can be represented by a role table 310, at least one role member table 340, and at least one permission table 350. A representation of a role behavior may also include one or more of tables 320, 380, and 360.

A role table 310 can be used to define a set of permissions, via the permission table 350, on a set of resources, via the resources table 360, for a set of users and groups, via the role_member table 340. A role_member table 340 can be either for a user or a group. A permission table 350 can define a set of actions which are permitted on resources defined in an associated resources table 360. The authorization table 320 includes records for authorization for various plan items, such as 204, 205, 208, 209 (FIG. 2), data 206, 207 (FIG. 2), and document folders 202 and 203 (FIG. 2) for each role based on defined permissions. The auth_condition table 380 includes rows for role conditions for case instances, as represented by a case 201 (FIG. 2).

According to one embodiment, authorizations and authorization conditions are in separate tables 320 and 380. The authorization conditions table 320 tracks the authorization conditions for every instance of a process. The two tables 320 and 380 can be used for efficiently performing joins when results are requested for data driven authorization per instance.

Typically, a process modeler is a user who understands the use cases of how a business operates and the process modeler designs a process model that works for most of the business's use cases. The process modeler can design certain roles that work for that business to operate. For example, in loan application case, there is a loan application submit stage, then a review stage where someone who reviews the loan application, and then there is an underwriting stage. Stages can also be referred to as steps of a process and these steps can be represented as nodes in a process resource hierarchy. There can be different roles having appropriate permissions on these stages/steps of the loan application process. Examples of roles are a submitter role, a reviewer role, and an underwriter role for a loan application process. A process model can represent the typical loan application process since a high percentage of the use cases follow the typical loan application process.

The modeler can design this business model and deploy it to a run time system and can start taking loan applications. Most of the loan application instances will obey the same roles and permissions defined by the modeler but sometimes there is an exception. Therefore, the business may want to change a role behavior for a specific loan application instance. For example, assume for the sake of illustration that there is a loan application that was submitted for a hundred million dollars. Since this loan is for a large sum of money, the business may want this particular loan application to be looked at by different people not just by the people with their respective roles assigned by the initial model design. More specifically, the business may want the submitter to not just have view permission but also to be granted additional permissions, such as document download permission, for this particular one million dollar loan application. Each loan application in this illustration is an example of an "instance." Continuing the example, the business may also grant a user who only had read permission for loan applications to also have update permission for this particular one million dollar loan application.

Therefore, according to various embodiments, for a specific instance (e.g., a particular loan application in this illustration), the role behavior can be modified with respect to membership and permissions. For example, the modeler can define a role specifying that user John typically has read access for loan applications. However, for a loan application above a million dollars, the role can be modified to provide John read and write access. Further, the role can be modified to also add another user, such as Bob, to that role behavior. In this case, the role behavior may be modified to give John who already belonged to that role, the additional permission to write, and added Bob, who didn't originally belong to the role behavior, to also have read and write access. In one example, that role that is modified may be an underwriter role. Modifying role behavior for a particular instance, in one embodiment, overrides that role's behavior on a per instance basis. In response to the modeler's input, a role table 310 is created to represent the role, a role member table 310 is created to represent John, another role table 310 is created to represent Bob, and two permissions tables 350 can be created to represent respective permissions for John and Bob. One role_member table 340 can represent a group of people. One or more permissions tables 350 can represent the permissions for the people in that group.

Therefore, various embodiments provide for modifying role behavior on the basis of needs and/or objectives of a business, company, organization, or department.

Conventionally, permissions were relatively static. Embodiments provide for selectively adapting the permissions of the role which can be driven based on data or other factors and that adaptation can be limited to a single instance. For example, assume for the sake of illustration that there are 100 loan applications for a business. A single loan application can be selected and the role behavior can be modified to change the privileges of that role behavior and to add additional or fewer users for that role behavior. The users are examples of members of the role behavior.

The problem with the prior art is that if a permission was specified at the process level, that permission is applied to all activities and artifacts of a hierarchy. The industry addressed this issue by defining separate permissions for each node in a hierarchy. However, this involves very intensive user interface interactions for each of the nodes.

Figure 4:
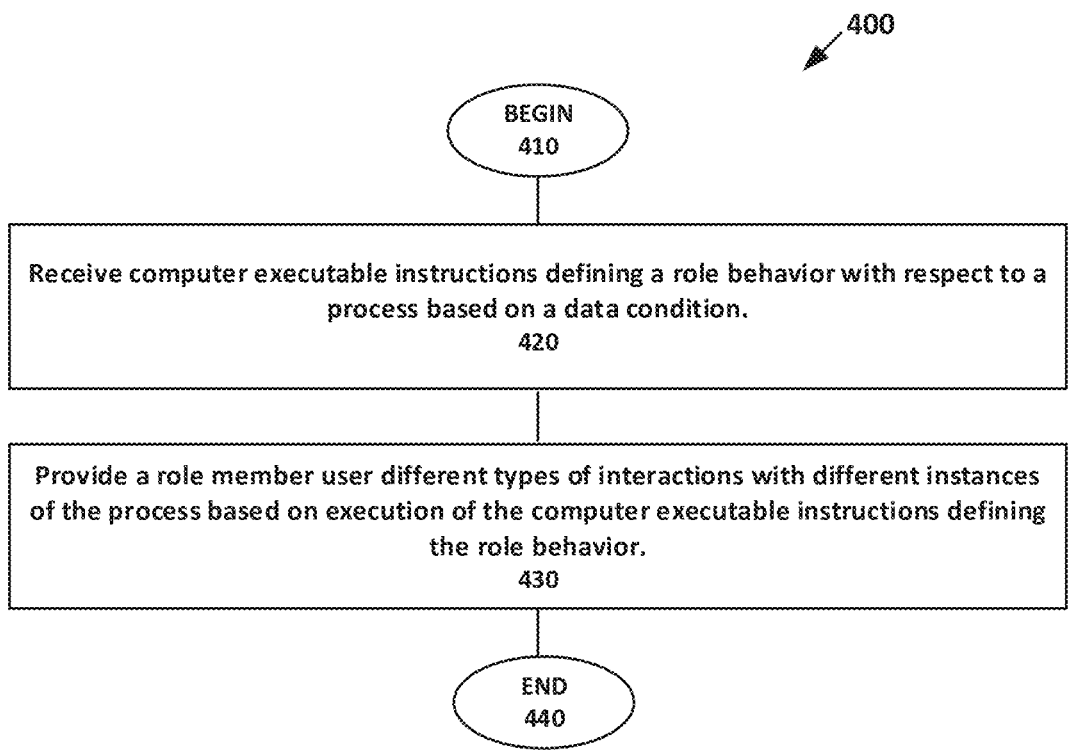
FIG. 4 depicts a flowchart for a method of providing data driven role permissions, according to one embodiment.

FIG. 4 depicts a flowchart for a method 400 of providing data driven role permissions, according to one embodiment.

This illustration of method 400 refers to FIG. 1.

At 410, the method begins.

At 420, computer executable instructions defining a role behavior with respect to a process based on a data condition are received. For example, computer executable instructions 110-160 can be received. An example of a process is loan application requests. An underwriter, such as an underwriter A, C, or D, is an example of a user in this illustration. The first paragraph including instructions 121-133 and the second paragraph including instructions 140-151 are two examples of defining role behaviors.

At 430, a role member user is provided different types of interactions with different instances of the process based on execution of the computer executable instructions defining the role behavior. For example, read permission specified in instruction 125 and read and update permissions specified in instruction 143 are examples of different types of interactions that the underwriter may be provided for different instances (different loan applications) of the loan application process.

At 440, the method ends.

Figure 5:
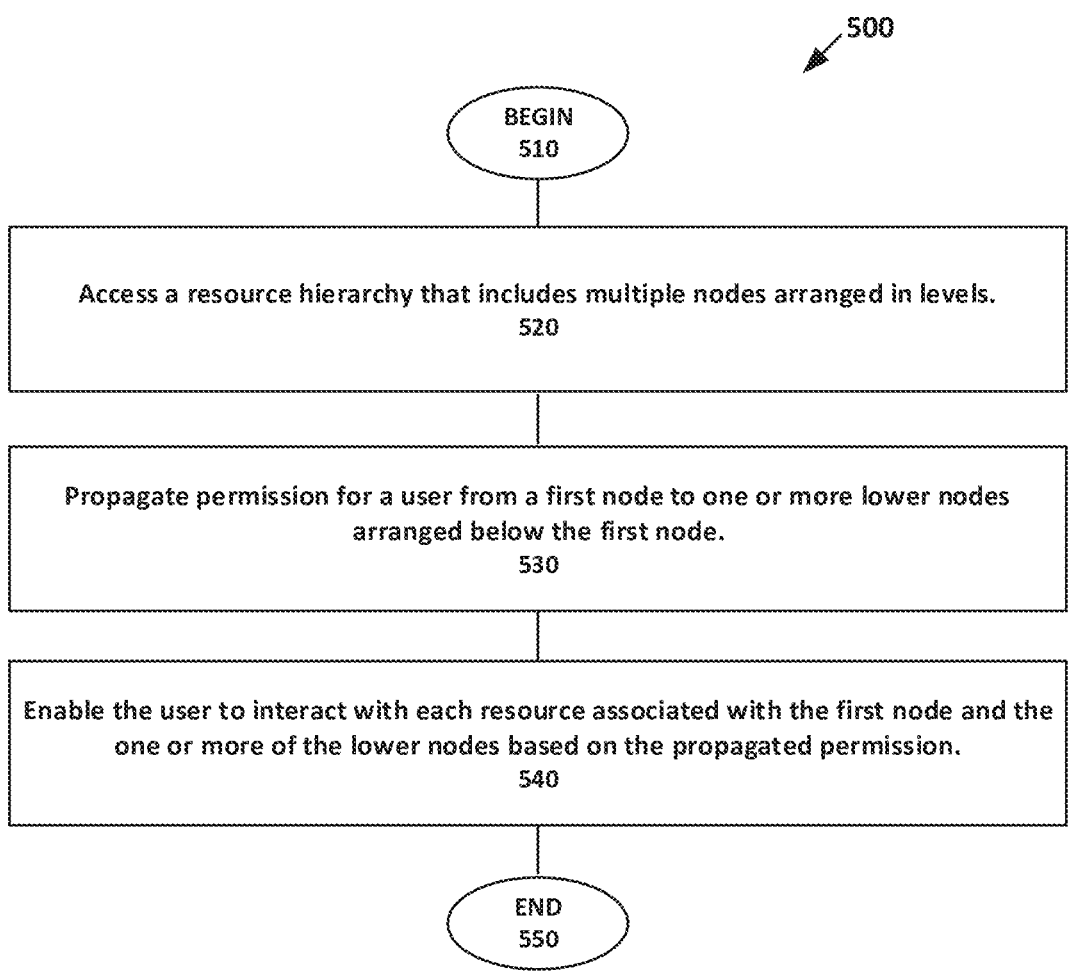
FIG. 5 depicts a flowchart of a method for propagating permissions on a resource hierarchy, according to one embodiment.

FIG. 5 depicts a flowchart of a method 500 for propagating permissions on a resource hierarchy, according to one embodiment.

This illustration of method 500 refers to FIG. 2.

At 510, the method begins.

At 520, a resource hierarchy that includes multiple nodes arranged in levels is accessed. FIG. 2 depicts a resource hierarchy 200 that has multiple nodes 201-209 that are arranged in levels (three levels in this example), where each of the nodes 201-209 is associated with separate resource, such as different pieces of data.

At 530, permission for a user can be propagated from a first node to one or more lower nodes arranged below the first node. For example, a permission, such as read, write, read and write, update, create, access, document download, document contribute, all, and/or none for a user, such as a particular doctor, can be propagated from a first node, such as node 204, to one or more lower nodes, such as 208 and/or 209, arranged below the first node 204.

At 540, the user is enabled to interact with each resource associated with the first node and the one or more of the lower nodes based on the propagated permission. Continuing the example, the user (e.g., doctor) can interact with each of the resources (pieces of data) associated with the first node, such as 204, and the one or more of the lower nodes, such as 208 and/or 209, based on the propagated permission.

At 550, the method ends.

An embodiment provides for wherein the role behavior includes a permission.

An embodiment provides for wherein the permission includes read, update, create, access, document download, document contribute, all, and none.

An embodiment provides for preventing propagation of the permission to at least one of the lower nodes. For example, the propagation of the permission can be prevented for any child node (and its children nodes) by defining a permission on that node. A node's descendant nodes are also referred to herein as "lower nodes." For example, a node's children, grandchildren, grant great children and so on are "lower nodes" with respect to that node. Continuing the example, if permission defined at node 200 is not be applied on node "204", then a separate permission can be defined at node 204. The permission defined at node 204 can be propagated to nodes 208 and 209, according to various embodiments.

An embodiment provides for accessing a particular role behavior associated with a particular instance of the process; and modifying a membership and a permission associated with the particular role behavior for the particular instance without modifying the particular role behavior for other instances of the process. For example, according to various embodiments, for a specific instance (e.g., a particular loan application in this illustration, the role behavior can be modified with respect to membership and/or permissions. More specifically, the modeler can define a role specifying that user John typically has read access for loan applications. However, for a loan application above a million dollars, the role can be modified to provide John read and write access. Further, the role can be modified to also add another user, such as Bob, to that role behavior. In this case, the role behavior may be modified to give John who already belonged to that role, the additional permission to write, and added Bob, who didn't originally belong to the role behavior, to also have read and write access. In one example, that role that is modified may be an underwriter role. Modifying role behavior for a particular instance, in one embodiment, overrides that role's behavior on a per instance basis. In response to the modeler's input, role table 310 is created to represent the role, a role member table 310 is created to represent John, another role table 310 is created to represent Bob, and two permissions tables 350 can be created to represent respective permissions for John and Bob.

An embodiment provides for providing a second role member user a second type of interaction with an instance of the process based on execution of the computer executable instructions defining the role behavior. Continuing the example, Bob and John have different permissions (or types of interaction) with an instance of the process based on the same role behavior. Embodiments are also well suited for two users to have different types of interactions with different instances for the same or different role behaviors. Thus, various embodiments provide for flexible definitions of user interactions with respect to various instances of a process based on one or more role behaviors.

Dynamic Process Authorization

Authorization capabilities are provided, according to one embodiment, as part of dynamic process feature Design Time The following are provided during design time, according to one embodiment:
1. Model roles and define its memberships
2. Model authorization to grant permissions for dynamic process resources (case, stages, activity, data) to principals
3. Model condition/expression based authorization
4. Support for out of the box ProcessOwner and ProcessViewer roles.

Runtime

The following are provided during runtime, according to one embodiment:
1. Allow changing authorization permission grants for dynamic process without requiring a redeploy
2. Support creating new roles after deployment and granting it permissions for one or more dynamic process resources
3. Support changing role memberships for a specific case instance
4. Support modify authorizations for a specific case instance 5. Restrict user action based on the granted permissions.

Roles

A Role defines a set of permissions on a set of resources for a set of users and groups. Table 310 (FIG. 3) can be used to represent a role.

Nested Roles may or may not be provided.

Out of the Box (OOTB) Roles

In composer, when a new dynamic process is created, two default out of the box roles can be created with the following default authorizations. They can be modified by user if requested.

| OOTB Role | Permissions | ScopeType | Comments |
|---|---|---|---|
| ProcessOwner | [CASE_INSTANCE, <caseId>, ALL] | Definition | Will have all permissions for the case |
| ProcessViewer | [CASE_INSTANCE, <caseId>, READ] | Definition | Will have only read permission for the case |

Role Scopes

A role can have one of the following scope types:

Global Role Scope

Global roles can be created only from workspace administration roles management UI. These roles can be granted permissions across more than one dynamic process. However, to improve usability, following restrictions can be put in place:

1. A Global role can only have permissions to all resources (i.e. resource='*') for a given resource type
2. A Global role cannot be granted granular permissions to specific case sub resource Following is an example global role permission

```
Role:
{
"roleId": "10",
"roleDisplayName": "Demo Role",
"scopeType": "GLOBAL"
"scope":"TravelRequest:1,PatientCase:2"
}
Permissions:
[
{
 "id": "20"
 "actions": ["CREATE", "READ", "UPDATE"],
 "resources":[
    {
      "resourceType": "CASE_INSTANCE",
      "resourceId": "*",
      "subResourceId":"*"
    }
  ]
},
{
 "id": "30",
 "actions": ["DOCUMENT_DOWNLOAD"],
 "resources":[
    {
      "resourceType": "CASE_DOCUMENT",
      "resourceId": "*",
      "subResourceId":"*"
    }
  ]
}
]
```

Definition Role Scope

Definition scoped roles can be created from workspace or composer. A Definition scoped role can be granted permissions to resources only within the corresponding case definition. Also, granular permissions may be defined for a specific resources within a given case definition. e.g.

```
Role:
{
"roleId": "10",
"roleDisplayName": "Travel Approver Role",
"scopeType": "DEFINITION"
"scope":"TravelRequest:1"
}
Permissions:
[
{
 "id": "20",
 "actions": ["CREATE", "READ", "UPDATE"],
 "resources":[
    {
      "resourceType": "CASE_INSTANCE",
      "resourceId": "*",
      "subResourceId":"*"
    }
  ]
},
{
 "id": "30",
 "actions": ["READ"],
 "resources":[
    {
      "resourceType": "CASE_EXECUTION",
      "resourceId": "ReviewStage",
      "subResourceId":"*"
    }
  ]
},
{
 "id": "40",
 "actions": ["ACCESS"],
 "resources":[
    {
      "resourceType": "CASE_DOCUMENT_FOLDER",
      "resourceId": "Tickets_Folder",
      "subResourceId":"*"
    },
    {
      "resourceType": "CASE_DOCUMENT_FOLDER",
      "resourceId": "Reciepts_Folder",
      "subResourceId":"*"
    }
  ]
}
]
```

Instance Role Scope

Instance scoped roles can be created only from workspace case instance UI. An instance scoped role can be granted permissions to resources only for a specific case instance. Also, granular permissions may be defined for a specific resource within a given case definition for a specific case instance. e.g.

```
Role:
{
"roleId": "10",
"roleDisplayName": "Travel Approver Role",
"scopeType": "INSTANCE"
"scope":"TravelRequest:1.23"
}
```

-continued

```
Permissions:
[
    {
        "id": "20",
        "actions": ["CREATE", "READ", "UPDATE"],
        "resources":[
            {
                "resourceType": "CASE_INSTANCE",
                "resourceId": "*",
                "subResourceId":"23"
            }
        ]
    },
    {
        "id": "21",
        "actions": ["READ"],
        "resources":[
            {
                "resourceType": "CASE_EXECUTION",
                "resourceId": "ReviewStage",
                "subResourceId":"23"
            }
        ]
    },
    {
        "id": "22",
        "actions": ["ACCESS"],
        "resources":[
            {
                "resourceType": "CASE_DOCUMENT_FOLDER",
                "resourceId": "Tickets_Folder",
                "subResourceId":"23"
            }
        ]
    }
]
        Overriding a role behavior for a specific instance
```

There are many use cases for which a change a role behavior for a specific instance can be used. For this purpose, an instance level role can be also used to override a global or definition scope role members and permissions for a specific case instance. When a global/definition role is overridden, all permissions and privileges are derived from the overriding role.

This is done by specifying the "overriddenRoleId" in the Role json (JavaScript Object Notation).

```
Role:
{
"roleId": "1_travel_approver_10",
"roleDisplayName": "Travel Approver Role",
"scopeType": "INSTANCE",
"scope":"TravelRequest:1.23",
"overridenRoleId" : "10"
}
Permissions:
[
    {
        "id": "30",
        "actions": ["READ"],
        "resources":[
            {
                "resourceType": "CASE_INSTANCE",
                "resourceId": "*",
                "subResourceId":"23"
            }
        ]
    },
    {
        "id": "21",
        "actions": ["NONE"],
        "resources":[
            {
                "resourceType": "CASE_EXECUTION",
```

```
                "resourceId": "ReviewStage",
                "subResourceId":"23"
            }
        ]
    },
    {
        "id": "22",
        "actions": ["DOCUMENT_DOWNLOAD"],
        "resources":[
            {
                "resourceType": "CASE_DOCUMENT_FOLDER",
                "resourceId": "Tickets_Folder",
                "subResourceId":"23"
            }
        ]
    }
]
```

Role Members

Role member ships can be defined for global, definition, and instance scoped roles. A Role member can be either a user or a group. Table 340 (FIG. 3) can be used to represent a role membership.

Resources

Each model entity which is or will be authorized is considered as a resource. Table 360 (FIG. 3) can be used to represent a resource. The following table depicts various supported resource types:

| | Resource Type | Description |
|---|---|---|
| 1. | CASE_INSTANCE | Represents the all case resources |
| 2. | CASE_EXECUTION | Represents a plan item of a case. e.g Stage, Task, Process, Milestone etc |
| 3. | CASE_DOCUMENT_FOLDER | Represents a document folder resource |
| 4. | CASE_DATA | Represents a data object |

Permissions

A permission defines a set of actions which are permitted on resource(s). A permission can be associated with multiple resources. Table 350 (FIG. 3) can be used to represent permissions.

Actions

| Action | Description |
|---|---|
| READ | This permission will control who can read a resource |
| UPDATE | This permission will control who can read and update a resource |
| CREATE | This permission will control who can read and create a new instance of a resource |
| ACCESS | Permission to allow a user to access/view documents in a document folder |
| DOCUMENT_DOWNLOAD | Permission to allow user to access and download documents in a document folder |
| DOCUMENT_CONTRIBUTE | Permission to allow user to access, download and upload documents in a document folder |
| ALL | Gives all create, read, write, delete permissions for a resource |
| NONE | No actions allowed on resource |

Resource and Actions Matrix

The Following table depicts how each action can be interpreted for various resources:

| | | | | |
|---|---|---|---|---|
| READ | 1. Read Case Definition<br>2. Read case instance.<br>3. Read all plan item instances<br>4. Read data unless specifically revoked<br>5. Read roles and permissions for current case instance | 1. Read Plan Item<br>2. Read Plan Item Execution instance | NA | Read Data |
| UPDATE | 1. Update/Complete/Terminate case instance<br>2. Add/Enable/Disable/Start/Complete plan item for case instance unless specifically revoked for a plan item<br>3. Update data for the case instance unless specifically revoked<br>4. Update roles and permissions for current case instance | Enable/Disable/Start/Complete plan item for a case instance | NA | Update data |
| CREATE | 1. Read Case Definition<br>2. Create new case instance | N/A | NA | NA |
| ACCESS | Read documents from folders, unless specifically revoked for a document folder | | 1. View folder<br>2. View documents in the folder | |
| DOCUMENT_DOWNLOAD | View and download documents from folders, unless specifically revoked for a document folder | N/A | 1. View Document Folder<br>2. View Documents in Folder<br>3. Download documents from folder | NA |
| DOCUMENT_CONTRIBUTE | View, download and upload documents to all folders, unless specifically revoked for a document folder | | 1. View Folder<br>2. View Documents in Folder<br>3. Download documents from folder<br>4. Upload documents to folder | |
| ALL | Can perform all above actions | Can perform all above actions | Can perform all above actions | Can perform all above actions |
| NONE | No actions allowed on case instance<br>No actions allowed on case instance plan items, data, documents unless overridden | No actions allowed on Plan Item or plan item instances | No actions allowed | No actions allowed |

Data Driven Role Permissions

Permissions can be defined based on case instance data. This allows certain permissions to apply only when a data condition is true. This allows defining different privileges for a role based on different data. E.g. For a Loan Approval Process, modeler may define that the "Underwriter" role has READ and UPDATE permission on "Loan" data object only if the loan amount is less than $1000.

FIG. 1 depicts an example of data based conditional permissions:

Authorization Hierarchical Inheritance

With respect to Hierarchical Inheritance, according to one embodiment:

1. Role can be a collection of one or more of the following:
   1. permissions granting/revoking actions on various resources
   2. Member users and groups 2. Authorization model will allow hierarchical inheritance: A GRANT for a top level resource is inherited by all its child entities. e.g. Grant defined at case level would automatically be inherited by all plan items, data and documents.

FIG. 2 depicts a block diagram of a resource hierarchy that can be used for authorization hierarchical inheritance, according to one embodiment.

3. Additional, authorizations, if needed, can be defined at child resource level.

4. Child level authorizations inherit the parent authorizations, according to one embodiment. However, parent authorizations can be revoked if needed for a child resource. Eg a Case Owner has permission to all case resources except the SSN data field of loan request data object.

Design Time Authorization Model

The design time authorization model is part of a cmmn file.

Sample Authorization Model

```xml
<!-- A authorization at a top level entity is inherited by all its child entities.
    e.g Grant defined at case level would automatically inherited by all its stages and
    planitems. Additional, authorization can be defined at child level, if needed -->
<cmmn:caseRoles>
   <cmmn:role name="owner"> <!--Default OOTB role-->
      <cmmn:extensionElements>
        <ora:permissions>
          <ora:permission>
            <ora:resources>
              <ora:resource resourceType="CASE_INSTANCE" resourceRef="*"/>
            </ora:resources>
            <ora:actions>ALL</ora:actions>
          </ora:permission>
          <ora:permission>
            <ora:resources>
              <ora:resource resourceType="CASE_EXECUTION" resourceRef="planItem_1"/>
            <ora:resources>
            <ora:actions>READ</ora:actions>
          </ora:permission>
          <ora:permission>   <!-- Permission to a specific field of the DO -->
            <ora:resources>
              <ora:resource resourceType="CASE_DATA" resourceRef="LoanFormDO.ssn"/>
            <ora:resources>
            <ora:actions>NONE</actions> <!-- A NONE action would mean "no action allowed"   -->
          </ora:permission>
          <ora:permission>   <!-- Permission to a specific document folder -->
            <ora:resources>
              <ora:resource resourceType="CASE_DOCUMENT_FOLDER" resourceRef="LoanApplicationDocuments"/>
            <ora:resources>
            <ora:actions>ACCESS</actions>
          </ora:permission>
        </ora:permissions>
        <ora:members>
          <ora:member type="user" value="jstein"/>
          <ora:member type="user" value="jcooper"/>
        </ora:members>
      </cmmn:extensionElements>
   </cmmn:role>
   <cmmn:role name="viewer"> <!--Default OOTB role-->
      <cmmn:extensionElements>
        <ora:permissions>
          <ora:permission>
            <ora:resources>
              <ora:resource resourceType="CASE_INSTANCE" resourceRef="*"/>
            </ora:resources>
            <ora:actions>READ</ora:actions>
          </ora:permission>
          <ora:permission> <!-- This will revoke permission to a specific field of the DO -->
            <ora:resources>
              <ora:resource resourceType="CASE_DATA" resourceRef="LoanFormDO.ssn"/>
            </ora:resources>
            <ora:actions>NONE</ora:actions> <!-- no action allowed on resource -->
          </ora:permission>
        </ora:permissions>
        <!-- no members defined -->
   </cmmn:role>
   <cmmn:role name="underwriter"> <!-- Custom role-->
      <cmmn:extensionElements>
        <ora:permissions>
          <ora:permission condition="${currentStage='UnderWriterApprovalStage'}">
            <ora:resources>
              <ora:resource resourceType="CASE_INSTANCE" resourceRef="*"/>
            </ora:resources>
```

```xml
            <ora:actions>READ</ora:actions>
         </ora:permission>
         <!-- Authorization on Data -->
         <ora:permission>
           <ora:resources>
             <ora:resource resourceType="CASE_DATA" resourceRef="LoanFormDO"/>
           </ora:resources>
           <ora:actions>READ,WRITE</ora:actions>
         </ora:permission>
         <!-- Note the conditional grant here -->
         <ora:permission condition="${amount < 10000}">
           <ora:resources>
             <ora:resource resourceType="CASE_EXECUTION" resourceRef="PlanItem_1"/>
           </ora:resources>
           <ora:actions>*</ora:actions>
         </ora:permission>
         <ora:permission>      <!-- Permission to a specific document folder -->
           <ora:resources>
             <ora:resource resourceType="CASE_DOCUMENT_FOLDER" resourceRef="LoanApplicationDocuments"/>
           </ora:resources>
           <ora:actions>DOCUMENT_CONTRIBUTE</actions>
         </ora:permission>
       </ora:permissions>
       <ora:members>
         <ora:member type="group" value="underwriter_grp"/>
       </ora:members>
     </cmmn:extensionElements>
  </cmmn:role>
  <cmmn:role name="loanSubmitter"> <!-- Custom role-->
     <cmmn:extensionElements>
       <ora:permissions>
         <!-- grant only document related permissions -->
         <ora:permission>
           <ora:resources>
             <ora:resource resourceType="CASE_DOCUMENT_FOLDER" resourceRef="LoanApplicationDocuments"/>
           </ora:resources>
           <ora:actions>DOCUMENT_CONTRIBUTE</ora:actions>
         </ora:permission>
       </ora:permissions>
       <ora:members>
         <ora:member type="group" value="loansubmitter_grp"/>
       </ora:members>
     </cmmn:extensionElements>
  </cmmn:role>
</cmmn:caseRoles>
```

ReST Application Programming Interfaces (APIs)

The role and authorization representational state transfer (REST) application programming interfaces (APIs) can cater to the use case of users being able to add/modify roles, role memberships and permission grants at runtime.

Roles

| | | ?/roles | |
|---|---|---|---|
| Verb | Request | Response | Description |
| POST | {<br>"displayName": "Demo Role",<br>"scopeType": "GLOBAL",<br>"scope": ["mycase:1"]<br>} | | Create a role |
| GET | Query Param<br>filter<br>scopeType<br>caseDefId<br>instanceid | [<br>{<br>"id": "10",<br>"displayName": "Demo Role",<br>"scopeType": "GLOBAL"<br>"scope": ["mycase: 1"]<br>},<br>{ | Get all roles |

-continued

| | | ?/roles | |
|---|---|---|---|
| Verb | Request | Response | Description |
| | | "id": "30",<br>"displayName": "Demo Role",<br>"scopeType": "DEFINITION"<br>"scope": ["mycase:2"]<br>}<br>] | |

| | ?/roles/{roleId} | | |
|---|---|---|---|
| Verb | Request | Response | Description |
| PUT | {<br>"id": "10",<br>"displayName":<br>"Demo Role",<br>"scopeType":<br>"GLOBAL"<br>"scopes":<br>["mydemo:1"]<br>} | | Update role and its memberships and/or memberships |

| | ?/roles/{roleId} | | |
|---|---|---|---|
| Verb | Request | Response | Description |
| GET | | {<br>"id": "10",<br>"displayName":<br>"Demo Role",<br>"scopeType":<br>"GLOBAL"<br>"scopes":<br>["mydemo:1"] | Get role, membership and permission details |
| DELETE | | | Delete a case role |

| | ?/roles/{roleId}/permissions | | |
|---|---|---|---|
| Verb | Request | Response | Description |
| POST | [<br>  {<br>    "object": {<br>      "condition": null,<br>      "actions": [<br>        "READ",<br>        "UPDATE"<br>      ],<br>      "resources": [<br>        {<br>          "resourceId": "*",<br>"resourceType":<br>"CASE_INSTANCE",<br>"subResourceId": "*"<br>        }<br>      ]<br>    },<br>    "type": "INSERT"<br>  },<br>  {<br>    "object": {<br>Query Params:<br>caseDefId<br>caseInstanceId | | Accepts a change request. Create/update/delete permissions for a role |
| GET | | [<br>{<br>id:"1"<br>"roleId":"demorole",<br>"actions": ["READ",<br>"UPDATE"],<br>"resources":[{<br>"resourceType":<br>"CASE_INSTANCE",<br>"resourceId": "demo",<br>"subResourceId":"*"<br>}]<br>}<br>] | Get all permissions for a role |

| ?/roles/{roleId}/members | | | |
|---|---|---|---|
| Verb | Request | Response | Description |
| GET |  | [<br>  {<br>    "id": "1",<br>    "memberName": "jstein",<br>    "memberType": "USER"<br>  },<br>  {<br>    "id": "2",<br>    "memberName": "supervisor",<br>    "memberType": "GROUP"<br>  }<br>] | Get all members of a role |
| POST | [<br>  {<br>    "object": {<br>      "memberName": "jcooper",<br>      "memberType": "USER"<br>    },<br>    "type": "INSERT"<br>  },<br>  {<br>    "object": {<br>      "id": "2",<br>      "memberName": "supervisor",<br>      "memberType": "GROUP"<br>    },<br>    "type": "DELETE"<br>  }<br>] |  | Accepts a change request. Add/Delete member(s) to a role |

Runtime Persistence Model

FIG. 3 depicts a block diagram of a runtime persistent model, according to one embodiment.

Process Cloud Services (PCS) Task Integration

The following PCS Task Integration procedures are used, according to various embodiments 1. In a Dynamic Process, a Human Task activity can be added and assigned to a dynamic process role only.

2. During runtime, the task can be reassigned to another dynamic process role.

3. When a task is assigned to a dynamic process role, it can have all allowed task assignee privileges (e.g. access and update task, task form, comments) and can override any dynamic process role permissions defined for that dynamic process role.

Although various embodiments are described in the context of human tasks, embodiments are well suited for other types of tasks, such as non-human tasks.

An Illustration

Runtime Processing

Deployment Time

When a case is being deployed, the following processing can be done using the design time authorization model, according to an embodiment.

1. Create DEFINITION scoped roles in "ROLE" table 310 (FIG. 3)

2. If roles members are defined in the design time authorization model, it is persisted to "ROLE_MEMBER" table 340 (FIG. 3)

3. Role permissions are populated in "PERMISSION" table 350 (FIG. 3)

1. This is used in order to allow show and manage permissions in the global roles and permissions management UI.

4. Engine calculates authorization for each plan item, data and document folder for each role based on the defined permissions and invokes Authorization Manager to insert records to "AUTHORIZATION" table 320 (FIG. 3)

1. If a permission is associated with a condition, the condition column will be populated. Otherwise, it will be populated with value as "default"

Case Execution Time

A case instances is an instance of a case as represented by case 201 (FIG. 2). The following is performed, according to an embodiment, during case instance execution:

1. At the start of case instance or when executing an activity, case engine will invoke Role Manager to get permissions defined for the current case definition.

2. Engine will extract all conditions defined across all role permissions for the case definition. This information can be cached.

3. Engine will evaluate each role condition for the current case instance and it will invoke the authorization manager to insert/update rows to the AUTH_CONDITION records table 380 (FIG. 3).

4. At every activity execution, case engine will re-evaluate all conditions and insert/update "AUTH_CONDITION" table 380 (FIG. 3).

5. [rolename, condition, InstanceId] will be used as key for upserting records

Roles and Permissions Management from Case Instance UI

A user will be able to view and modify role members and change their permissions from a case instance UI. The users having [CASE, WRITE] are allowed to perform updates to roles and permissions. According to one embodiment, only the users having [CASE, WRITE] are allowed to perform updates to roles and permissions.

Role REST APIs will be invoked which will fetch all Roles and their permissions for the current case instance.

View Case Instance Roles

Role REST APIs will fetch Roles for an instance by querying role names from ROLE table and filtering the result by Scope value, for example, based on case definition id and current instance id. If any role is overridden by an instance specific role, according to an embodiment, it will be remove from the result

```
SELECT DISTINCT
    ROLENAME, DISPLAYNAME
FROM
    ROLE, PERMISSION
WHERE
ROLE.ROLENAME=PERMISSION.GRANTEENAME AND
(PERMISSION.INSTANCEID - '*' OR PERMISSION.INSTANCEID = :INSTANCEID)
AND PERMISSION.RESOURCEDDEFID = :CASEDEFID
AND ROLENAME NOT IN
    (SELECT ROLENAME FROM ROLE_INST_OVERRIDE WHERE INSTANCEID =
    :InstanceId)
```

View Case Instance Role Permissions

RoleManager API will fetch Permission information for an instance, for example, by joining ROLE and PERMISSION table and filtering the result by case definition id.

```
SELECT
    *
FROM
    PERMISSION
WHERE
ROLE.ROLENAME=:roleName
AND PERMISSION.RESOURCEDDEFID = :CASEDEFID
```

View Case Instance Role Members

RoleManager API will query role memberships defined for the specific role from "ROLE_MEMBER" table. According to an embodiment, RoleManager API queries all role memberships defined for the specific role from "ROLE_MEMBER" table.

```
SELECT
    *
FROM
    ROLE_MEMBER
WHERE
ROLENAME=:roleName
```

Update Case Instance Role Membership and/or Permissions

When user modifies the role members, following is performed, according to one embodiment:
a) If the role is a global or definition scoped role,
  i) UI will send a request to create a new Instance scoped role overriding the existing global/definition scoped role. The display name will be same as original role name.
  ii) REST API will create and store the record in a ROLE table
b) UI will then send a request to update the membership info. Members will be created/removed from "ROLE_MEMBER" table or the role created for the instance.
c) Store the updated permissions for new role in "PERMISSION' table
d) Invoke the Engine application programming interface (API) to update the authorizations for the new role
  i) Create authorization at case instance and each plan item level for the new instance level role.
  ii) Find the original role overridden by the current role, create/update instance level condition for each condition for the original role in "AUTH_CONDITION" table and set its value to false. Also, add a record for "default" condition for original role and set its value to false for current instance.

Global Roles and Permission Management User Interface (UI)

An administration user can access the global role and permission management UI. According to an embodiment, only an administration user can access the global role and permission management UI.

View Roles

Roles will be fetched by querying against "Role" table with filter isGlobal='true'
API: RoleManager.getRoles( )

View Global Role Membership

Global role membership can be fetched by querying against ROLE_MEMBER table for a given role name.
API: RoleManager.getRoleMembers(RoleName)

Add New Role

Insert a record in ROLE table.
API: RoleManager.createRole(RoleName)

Edit Role Memberships

UPSERT membership record in ROLE_MEMBERSHIP table with key as [RoleName, MemberName, MemberType]
API: RoleManager.updateRoleMembers(RoleName, List<RoleMember>)

View Global Role Permissions

Query records from PERMISSION table for a given role
API: RoleManager.getRolePermissions(RoleName)

Edit Global Role Permissions

The following are performed with respect to editing global role permissions, according to one embodiment:
1. Update record in PERMISSION table for the given role.
   API: RoleManager.updateRolePermissions(RoleName. Permission)
2. Invoke Engine API to update authorization

Enforcement

Enforcements can be performed at one or more, or all REST API entry point. Each entity manager or service command API can check for specific permissions before proceeding.

Fetching/Updating a Singular Resource

According to an embodiment, for fetching and/or updating a singular resource, the AuthorizationManager.hasPermission(security context, resourceId, resourceType, instance id, action) is used as follows:
1. Invoke RoleManager.getRoles( ) to get all Roles granted to a user and its groups
2. Query "AUTHORIZATION" table to get fetch all permissions granted to current user, its groups and roles for the current case instance and evaluate if current user has the requested permission
3. SELECT B.* FROM
4. AUTHORIZATION B,
5. LEFT OUTER JOIN AUTH_CONDITION C ON (C.INSTANCEID=:INSTANCEID AND C.CONDITION=B.CONDITION AND C.GRANTEE=B.ROLE_NAME)
6. WHERE
7. B.ROLE_NAME IN (:userroles)
8. AND (B.INSTANCE_ID='*' OR B.INSTANCE_ID=:INSTANCEID)
9. AND B.RESOURCEID=:DEFID
10. AND B.RESOURCETYPE=:RESTYPE
11. AND B.ACTIONS LIKE:ACTION
    AND (C.CONDITION_VALUE IS NULL OR C.CONDITION_VALUE='1')

Data Field Read/Write Permission Check

To avoid performance issues, different approaches can be used when checking for data update permissions. As a data object can have multiple fields, instead of checking permissions for every field, the API can first fetch all instance specific authorizations defined for targeted data object with "DATA" resource type and then ensure that appropriate READ/WRITE permissions are satisfied for current user.

Case Definition/Instance/Execution/Data Listing

For listing, according to one embodiment, it shows only those case instances/execution/data records that a user is authorized to view. For performance reasons, a direct data base query can be performed joining CASE_INSTANCE table with AUTHORIZATION table. i.e.

```
SELECT A.* FROM CASE_INSTANCE A,
            INNER JOIN AUTHORIZATION B ON (B.RESOURCEID = A.DEFID
AND
                                          (B.INSTANCEID = -1 OR
B.INSTANCEID = A.INSTANCE_ID)),
            LEFT OUTER JOIN AUTH_CONDITION C ON (C.INSTANCEID =
A.INSTANCEID AND C.CONDITION = B.CONDITION AND C.GRANTEE = B.ROLE_NAME)
WHERE
    B.RESOURCETYPE='CASE_INSTANCE'
    AND BITAND(B.ACTIONS, :ACTION) = :ACTION -- action param will be
set to READ
AND B.GRANTEE    IN  (:userroles)
AND (C.CONDITION IS NULL OR C.VALUE = 'true')
```

Further details of embodiments are provided in documents as: "Oracle® Cloud Dynamic Process" EEE000-00, October 2017, 53 pages, which is hereby incorporated by reference as if set forth in full in this application for all purposes.

Example Computer Environment

Figure 6:
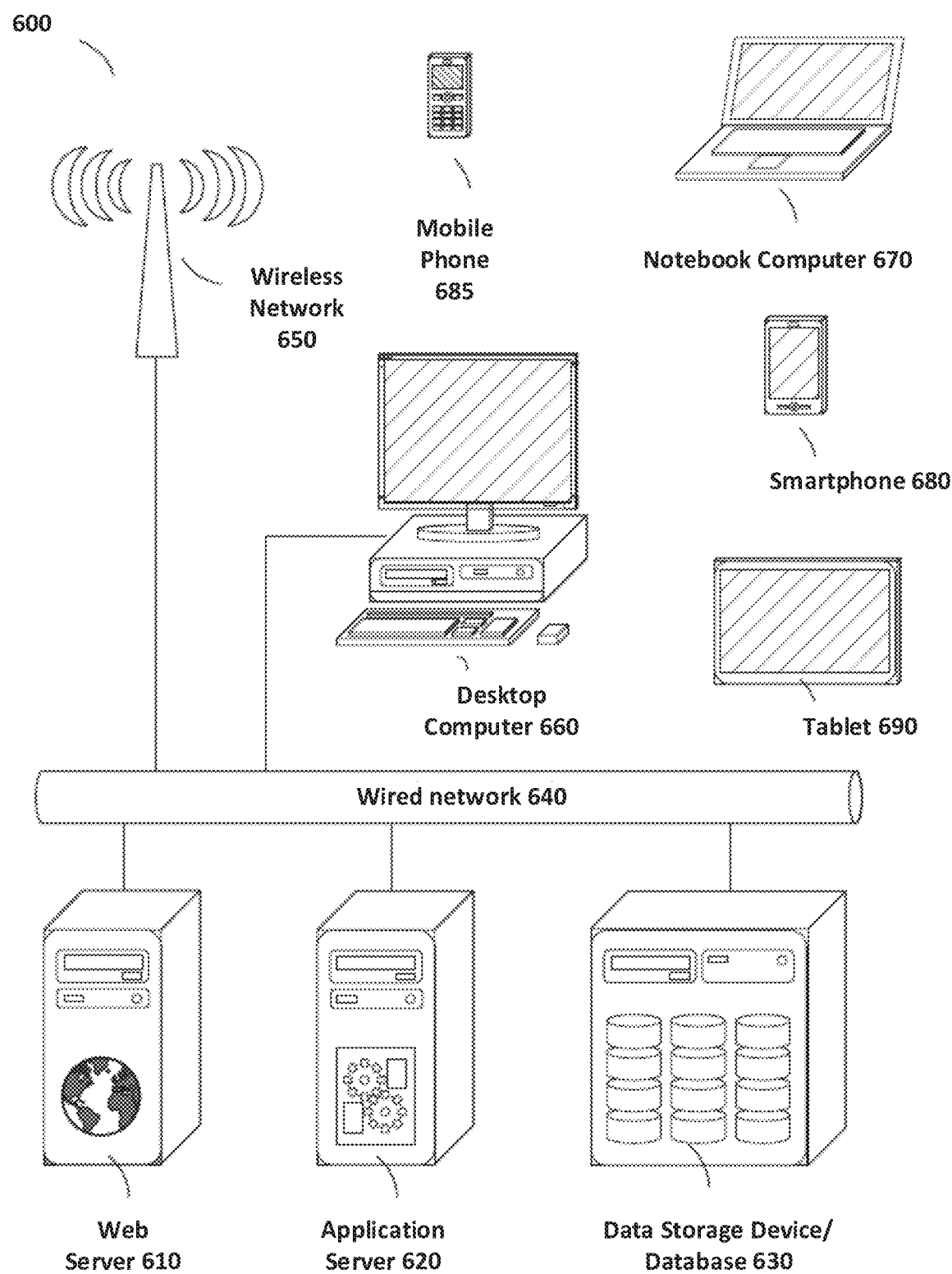
FIG. 6 is a general block diagram of a system and accompanying computing environment usable to implement the embodiments of Figures depicted herein.

FIG. 6 is a general block diagram of a system 600 and accompanying computing environment usable to implement the embodiments of Figures depicted herein. The example system 600 is capable of supporting or running various hardware and/or software modules and associated methods discussed with reference to FIGS. 1-5. Note that certain embodiments may be implemented using one or more stand-alone applications (for example, residing in a user device)

and/or one or more web-based applications implemented using a combination of client-side and server-side code.

The general system 600 includes user devices 660-690, including desktop computers 260, notebook computers 670, smartphones 680, mobile phones 685, and tablets 690. The general system 600 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 600 is shown with five user devices, any number of user devices can be supported.

A web server 610 is used to process requests from web browsers and standalone applications for web pages, electronic documents, enterprise data or other content, and other data from the user computers. The web server 610 may also provide push data or syndicated content, such as RSS feeds, of data related to enterprise operations.

An application server 620 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 620 are adapted to process input data and user computer requests and can store or retrieve data from data storage device or database 630. Database 630 stores data created and used by the data applications. In an embodiment, the database 630 includes a relational database that is adapted to store, update, and retrieve data in response to SQL format commands or other database query languages. Other embodiments may use unstructured data storage architectures and NoSQL (Not Only SQL) databases.

In an embodiment, the application server 620 includes one or more general-purpose computers capable of executing programs or scripts. In an embodiment, web server 610 is implemented as an application running on the one or more general-purpose computers. The web server 610 and application server 620 may be combined and executed on the same computers.

An electronic communication network 640-650 enables communication between user computers 660-290, web server 610, application server 620, and database 630. In an embodiment, networks 640-650 may further include any form of electrical or optical communication devices, including wired network 640 and wireless network 650. Networks 640-650 may also incorporate one or more local-area networks, such as an Ethernet network, wide-area networks, such as the Internet; cellular carrier data networks; and virtual networks, such as a virtual private network.

The system 600 is one example for executing applications according to an embodiment of the invention. In another embodiment, web server 610, application server 620, and optionally database 630 can be combined into a single server computer application and system. In a further embodiment, virtualization and virtual machine applications may be used to implement one or more of the web server 610, application server 620, and database 630.

In still further embodiments, all or a portion of the web and application serving functions may be integrated into an application running on each of the user computers. For example, a JavaScript application on the user computer may be used to retrieve or analyze data and display portions of the applications.

In a particular example embodiment, the user computing devices 660-690 run browsers, e.g., used to display the user interfaces. User interface may be viewed from a client computing device, such as a desktop computer 660, notebook computer 670, smartphone 680, mobile phone 685, tablet 690, of FIG. 6 and/or other computing devices.

In a particular example embodiment, browsers of the desktop computer 660, notebook computer 670, smartphone 680, mobile phone 685, tablet 690 of FIG. 6 connect to the Internet, represented by the wired network 640 and/or wireless network 650 as shown in FIG. 6, to access one or more network-coupled servers, databases, and/or associated cloud-based functionality, as represented by the modules of FIGS. 1-3.

Users, such as process modelers and administrators, can interact with user computing devices 660-690 to provide information and interactions including permissions and cause them to be propagated through a resource hierarchy, to provide computer executable instructions that define data driven role permissions, and/or to define instance level role permissions/memberships override, as discussed herein. According to one embodiment, that user computing devices 660-690 can reside in a service cloud that is communicatively coupled with an integration cloud. The information provided by the users, such as roles, role behaviors, permissions, resource hierarchies, permission models, and/or run-time persistence models, can be stored on data storage device/database 230. The user can interact with user interfaces provided by one or more application servers 220. The user interface may be web pages that are displayed by a browser of the user computing device 660-690. Computer executable instructions of application servers 220 and/or web servers 210, alone or in communication with each other, can execute to process the user specified information and provide various embodiments.

That information and interactions can be communicated from the user computing devices 660-690 to one or more servers, such as servers 620 and/or 610 that resides in the integration cloud. Various information can be stored in databases 630 associated the integration cloud.

Figure 7:
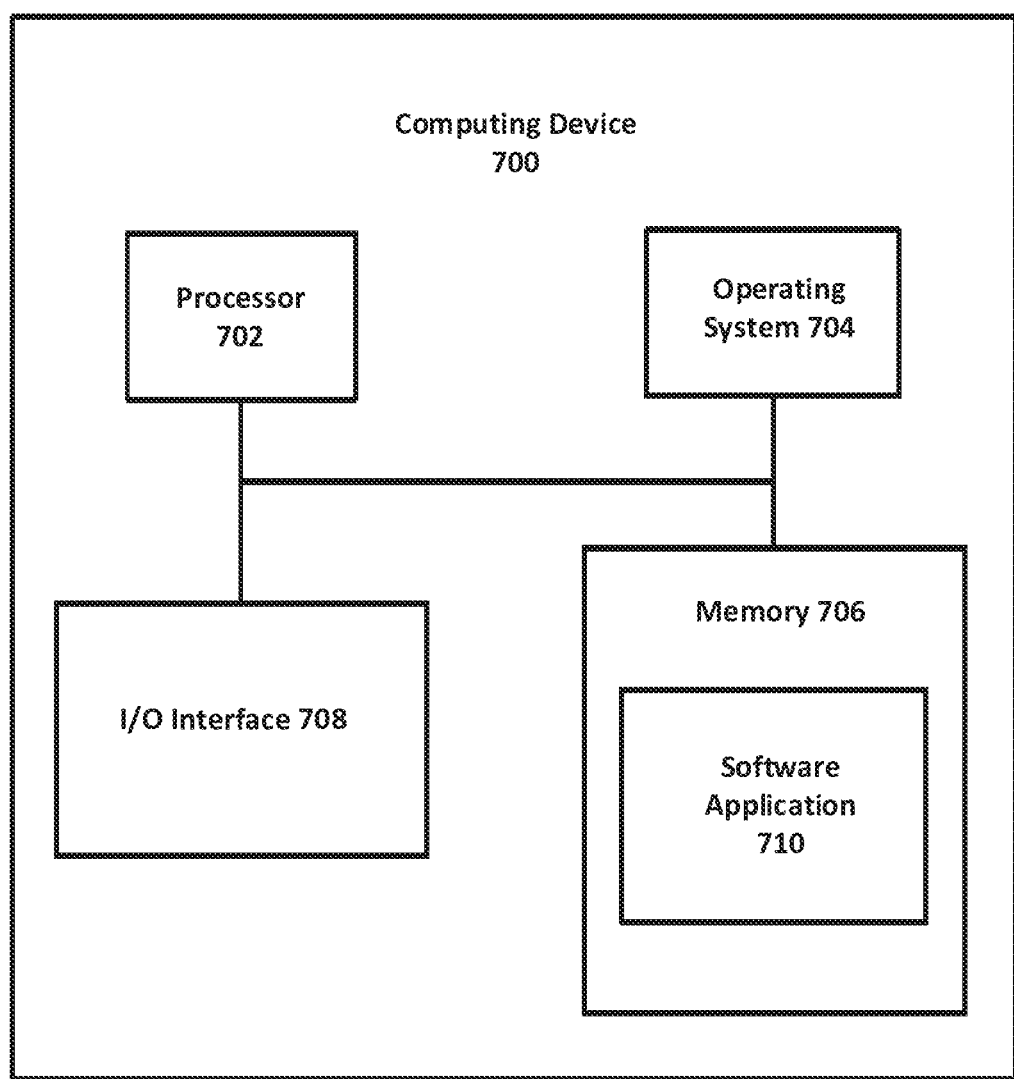
FIG. 7 is a general block diagram of a computing device usable to implement the embodiments described herein.

FIG. 7 is a general block diagram of a computing device 700 usable to implement the embodiments described herein. While the computing device 700 of FIG. 7 may be described as performing one or more of the steps in the embodiments herein, in other embodiments any suitable component or combination of components of the computing device 700 or any suitable processor or processors associated with system 700 may facilitate performing the steps.

FIG. 7 illustrates a block diagram of an example computing system 700, which may be used for implementations described herein. For example, computing system 700 may be used to implement user devices 660-690, and server devices 610, 620 of FIG. 6 as well as to perform the method implementations described herein. In some implementations, computing system 700 may include a processor 702, an operating system 704, a memory 706, and an input/output (I/O) interface 708. In various implementations, processor 702 may be used to implement various functions and features described herein, as well as to perform the method implementations described herein. While processor 702 is described as performing implementations described herein, any suitable component or combination of components of system 700 or any suitable processor or processors associated with system 700 or any suitable system may perform the steps described. Implementations described herein may be carried out on a user device, on a server, or a combination of both.

Computing device 700 also includes a software application 710, which may be stored on memory 706 or on any other suitable storage location or computer-readable medium. Software application 710 provides instructions that enable processor 702 to perform the functions described herein and other functions. The components of computing system 700 may be implemented by one or more processors or any combination of hardware devices, as well as any combination of hardware, software, firmware, etc.

For ease of illustration, FIG. 7 shows one block for each of processor 702, operating system 704, memory 706, I/O interface 708, and software application 710. These blocks 702, 704, 706, 708, and 710 may represent multiple processors, operating systems, memories, I/O interfaces, and software applications. In various implementations, computing system 300 may not have all of the components shown and/or may have other elements including other types of components instead of, or in addition to, those shown herein.

A Computer Readable Medium and an Apparatus

Unless otherwise specified, any one or more of the embodiments described herein can be implemented using processor readable instructions which reside, for example, in non-transitory processor-readable storage device of a computer system or like device. The non-transitory processor-readable storage device can be any kind of physical memory that instructions can be stored on. Examples of the non-transitory processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within non-transitory processor-readable storage device of a computer system and are executed by one or more processors of the computer system. When executed, the instructions cause a computer system to implement the functionality of various embodiments of the present invention. For example, the instructions can be executed by a processor. The processor is a hardware processor, such as a central processing unit, associated with the computer system. The non-transitory processor-readable storage device is hardware memory and the one or more processors are hardware processors. According to one embodiment, a non-transitory processor-readable storage device is a tangible physical device.

An embodiment provides an apparatus that provides data driven role permissions mutation, comprising: one or more processors; and a non-transitory processor-readable storage device including instructions for: receiving computer executable instructions defining a role behavior with respect to a process based on a data condition; and providing a role member user different types of interactions with different instances of the process based on execution of the computer executable instructions defining the role behavior.

CONCLUSION

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable storage device including instructions for a method of providing data driven role permissions, the method comprising:
    receiving computer executable instructions defining a role behavior with respect to a process based on a data condition; and
    providing different types of interactions for different instances of the process to a role member based on execution of the computer executable instructions defining the role behavior.

2. The non-transitory processor-readable storage device of claim 1, wherein the role behavior includes a permission.

3. The non-transitory processor-readable storage device of claim 2, wherein the permission includes read, update, create, access, document_download, document_contribute, all, and none.

4. The non-transitory processor-readable storage device of claim 1, wherein the method further comprises: accessing a resource hierarchy that includes multiple nodes arranged in levels.

5. The non-transitory processor-readable storage device of claim 4, wherein each of the nodes is associated with a separate resource.

6. The non-transitory processor-readable storage device of claim 4, wherein the method further comprises: propagating a permission for the user from a first node to one or more lower nodes arranged below the first node in a resource hierarchy.

7. The non-transitory processor-readable storage device of claim 6, wherein the method further comprises: enabling the user to interact with each resource associated with the first node and the one or more of the lower nodes based on the propagated permission.

8. The non-transitory processor-readable storage device of claim 6, wherein the method further comprises: preventing propagation of the permission to at least one of the lower nodes.

9. The non-transitory processor-readable storage device of claim 1, wherein the method further comprises:
    accessing a particular role behavior associated with a particular instance of the process; and
    modifying a membership and a permission associated with the particular role behavior for the particular instance without modifying the particular role behavior for other instances of the process.

10. The non-transitory processor-readable storage device of claim 1, wherein the method further comprises: providing a second role member user a second type of interaction with an instance of the process based on execution of the computer executable instructions defining the role behavior.

11. A method of providing data driven role permissions, the method comprising:
    receiving computer executable instructions defining a role behavior with respect to a process based on a data condition; and
    providing different types of interactions for different instances of the process to a role member based on execution of the computer executable instructions defining the role behavior.

12. The method of claim 11, wherein the role behavior includes a permission.

13. The method of claim 12, wherein the permission includes read, update, create, access, document_download, document_contribute, all, and none.

14. The method of claim 11, wherein the method further comprises:
    accessing a resource hierarchy that includes multiple nodes arranged in levels.

15. The method of claim 14, wherein each of the nodes is associated with a separate resource.

16. The method of claim 14, wherein the method further comprises: propagating a permission for the user from a first node to one or more lower nodes arranged below the first node in a resource hierarchy.

17. The method of claim 16, wherein the method further comprises: enabling the user to interact with each resource associated with the first node and the one or more of the lower nodes based on the propagated permission.

18. The method of claim 16, wherein the method further comprises: preventing propagation of the permission to at least one of the lower nodes.

19. The method of claim 11, wherein the method further comprises:
    accessing a particular role behavior associated with a particular instance of the process; and
    modifying a membership and a permission associated with the particular role behavior for the particular instance without modifying the particular role behavior for other instances of the process.

20. An apparatus that provides data driven role permissions mutation, comprising:
    one or more processors; and
    a non-transitory processor-readable storage device including instructions for:
        receiving computer executable instructions defining a role behavior with respect to a process based on a data condition; and
        providing different types of interactions for different instances of the process to a role member based on execution of the computer executable instructions defining the role behavior.

* * * * *